May 6, 1941.                    E. O. MUELLER                    2,240,665
                        QUILL BEARING FOR RAILWAY MOTORS
                             Filed April 28, 1938
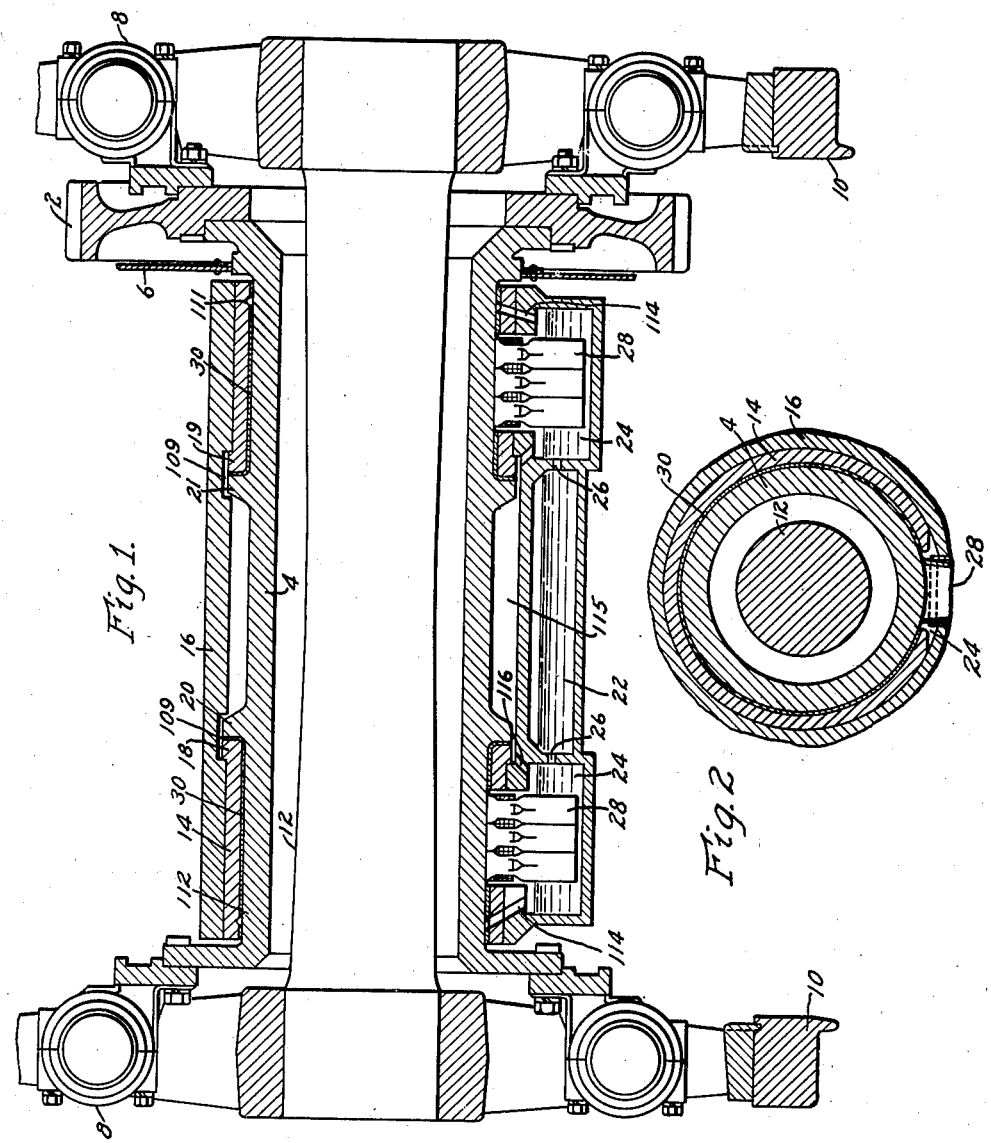
WITNESSES:                                                INVENTOR
Leon M. Garman                                         Erich O. Mueller.
Bernard L. Zangwill                                    BY
                                                       O.B. Buchanan
                                                          ATTORNEY Patented May 6, 1941

2,240,665

UNITED STATES PATENT OFFICE 2,240,665

QUILL BEARING FOR RAILWAY MOTORS

Erich O. Mueller, Irwin, Pa., assignor to Westinghouse Electric & Manufacturing Company, East Pittsburgh, Pa., a corporation of Pennsylvania Application April 28, 1938, Serial No. 204,722

7 Claims. (Cl. 308—132)

In certain forms of electric railway traction, power is supplied to the track wheels by means of a quill spider attached to a rotatable quill which, in turn, is geared to the driving motor or motors. Large power and forces are necessarily involved and the means for supporting the quill and taking up the thrusts due to movement and sway of the locomotive frequently presents a serious problem.

It has been the practice heretofore, so far as I am aware, to provide supporting bearings as close to the ends of the quill as possible, the outside surfaces of the ends of these bearings being formed to provide thrust bearing surfaces and the quill ends shaped to correspond. The thrust bearings so formed are lubricated by oil which is permitted to flow out of the supporting bearing. In view of the proximity of the thrust bearings to the wheels, a satisfactory collecting means for the oil escaping from the thrust bearings has not been possible, so that considerable oil is now permitted to flow, fall and spatter out of the ends of the thrust bearings, and is lost. At the gear case end, separating means are found necessary to prevent the infiltration of this escaping oil into the gear case and diluting the gear lubricant therein.

In the customary structures, the quill bearings are lubricated by wick oiling from oil chambers at the bottom portions of the bearings. Oil is supplied to the oil chambers from a storage reservoir and a construction is customarily employed which will maintain the oil in the oil chambers at a constant level, the oil in the oil chambers being replenished from the storage reservoir as the oil is used up or otherwise lost. The oil level must necessarily be high in the oil chambers to insure proper lubrication for the bearings at high speeds under heavy loads. In addition, some of this oil must be permitted to flow outward over the bearings in order that the thrust bearings at the ends of the bearings be lubricated. In view of the large forces on the thrust bearing, the thrust surfaces have been made long or of large area so that a minimum of lubrication need be applied. In this manner, oil was conserved to some extent, but nevertheless, ultimately found its way to the end of the thrust bearing and then was lost, as aforementioned. On trains with schedules requiring long non-stop runs, a relatively large oil reservoir must be supplied in order to insure an adequate supply of oil to the bearings throughout the run. Even in the shorter runs, frequent inspection and replenishment of the oil in the reservoir are found necessary.

It is accordingly a purpose of my invention to provide a structure which will materially decrease the oil consumption and thereby effect an economy in the construction of the drive as well as in the running expense of the train.

It is an object of my invention to locate and lubricate the thrust bearings in such a manner that the oil dripping or flowing therefrom may be collected and directed back to the oil chamber or reservoir. Because no oil is lost by this construction, I may supply a greater quantity of oil to the thrust bearings and thereby decrease the possibility of damage to them. My construction is particularly adaptable to forced lubrication which in the old structure would force oil right out of the thrust bearings and be lost, but in my construction recirculates the oil for better lubrication. Moreover, a greater quantity of oil supplied to the thrust bearings permits a lesser area thereof. Experience has shown that with the old structure, it is very difficult to determine and control the amount of oil needed to lubricate the thrust bearings. To be safe under all operating conditions, it is necessary to use a relatively large amount of oil that is wasted and cannot be recovered. My construction insures that the thrust bearing will under all conditions obtain the necessary amount of oil, and this oil recovered and used again.

It is another object of my invention to locate the thrust bearings so as not to be exposed to dust and cinders from the roadbed, as is the case with prior constructions.

Many other objects and important novel features of my invention will be apparent from the following description of a specific embodiment thereof and in the drawing of which like numerals refer to similar parts, and in which:

Figure 1 is a sectional view typical of a traction drive embodying my invention; and Fig. 2 is a vertical cross-sectional view through one of the oil chambers.

Referring to Fig. 1, a driving means (not shown) usually comprising an electric motor or motors and a pinion keyed to the shaft thereof, drives a gear wheel 2 secured to a quill 4. Gear wheel 2 is enclosed in a gear case, part of which is designated by a reference character 6. Attached to the quill or driving gear is the quill spider or drive represented generally by 8, and this resilient drive transmits the power to the traction wheels 10 of a railway car, usually a locomotive. The wheels 10 are mounted on an axle 12 which rotates within the quill 4 and spaced therefrom to provide leeway for relative movement, all as is common in the art. The quill is supported in a pair of axially spaced bearings 14, themselves supported by a substantially cylindrical quill cap or housing 16 which extends substantially across both bearings and the intervening space therebetween. The bearings 14 are usually at each end of the quill, as shown, and have turned-up flanges 18 and 19, respectively, at their inner ends, that is the ends away from the resilient quill drives. The vertical exterior surface of each flange forms a thrust bearing to take up axial or horizontal thrusts of the quill 4, the latter being formed with quill protruding flanges 20 and 21 adjacent the flanges 18 and 19, respectively. The bearings 14 and quill cap 16 are usually split to facilitate the assembly of the driving unit as a whole and a portion of the lower parts thereof is cut away as shown more particularly in Fig. 2 to permit of the lubrication of the bearings.

A common means of lubricating the quill drive shown comprises an oil reservoir 22 in the bottom portion of the housing 16, between the two bearings 14, said reservoir being of sufficient size to hold an oil supply adequate at least for the longest contemplated non-stop run of a train. The reservoir supplies oil to both chambers 24 for the bearings 14 through conduits or openings indicated in general at 26. The details of the manner in which the oil is permitted to flow from the reservoir to the oil chambers have been omitted from the drawing, inasmuch as this forms no part of my invention and may be any commonly used expedient, preferably one which maintains the oil level in the bearing oil chambers at a constant level. The oil in the chambers 24 is applied to the quill by any appropriate means, shown in the instant case as wool wicks 28.

In operation, the lubricant in the chambers 24 is drawn up by the wicks 28 and applied to the outside surface of the quill which rotates against the bearing metal 30 of the bearings 14. Each of these bearings usually has a very small trough cut in the inside bearing lining to distribute the lubricating oil over the length of the bearing.

A friction reducing substance is applied to the flanges 18 and 19, the flange 18 forming a thrust bearing for taking any thrusts of the quill 4 to the left with respect to Fig. 1, these thrusts being transmitted through the cooperating quill flange 20, while the flange 19 similarly forms a thrust bearing for taking any thrusts of the quill 4 to the right, the latter thrusts being transmitted through the cooperating quill flange 21. In this connection, the flanges 18 and 19 may be assumed to include the inner concentric portions of the bearing 14 from which the protruding portions of the flanges extend.

Circumferential grooves 109 may be cut into the quill cap 16 to permit the flanges 18 and 19 to abut the walls of the grooves so that thrusts are resisted by the quill cap and thereby transmitted to the truck frame. However, the bearings 14 may be secured to the cap 16 so as to resist sufficiently the thrust forces applied at the ends thereof. In the latter instance, the bearings need not have a protruding flange portion. However, a slightly larger area of thrust bearing surfaces is obtained by extending the flanges into the grooves 109, as shown.

The structure shown in Fig. 1 has certain marked advantages. As may be seen, the outside portions of the bearings need not lubricate any thrust surface so that circumferential lubricant collecting grooves 111 and 112 may be cut into the bearing in proximity to the quill-side ends thereof. Outflowing oil will now be caught in these grooves and flow back to the oil chambers 24 through oil passages 114 extending through the bearings from the grooves 111 and 112 to the oil chambers.

In the new structure, the inner portions of the bearings now provide the thrust surfaces, and any oil flowing outward from the thrust surfaces enters an auxiliary collecting chamber 115 which is formed by the adjacent walls of the quill cap 16 and the oil reservoir 22. Oil is supplied to the oil chambers 24 from the reservoir through the holes 26, and any oil in the auxiliary chamber 115 also finds its way to the chambers 24 through the drain holes 116.

As is common to bearings of this character, small, oil-spreading troughs may be cut on the inside of the bearings 14 to assure an abundant supply of oil to all areas of the bearings.

It may thus be seen that I provide means for catching the oil at both ends of the bearing and returning it to the oil supply for the bearings. Manifestly, with this construction, very little oil can escape from the lubricating system. Because of this structure, I not only remove the possibility of the dilution of gear case grease, but enable the use of forced lubrication since the oil is collected and returned to the lubricating system.

While I have shown my invention in the form in which I now believe to be the best mode of application thereof, it is obvious that many changes may be made within the spirit and scope of the novel construction which I have introduced and it may be applied to many different forms of lubricating systems. It is desired, therefore, that the appended claims be given the broadest construction consistent with their language, limited only by the prior art.

I claim as my invention:

1. In combination, a journaled member, a substantially cylindrical bearing-supporting housing for said journaled member, a pair of axially spaced bearings, one at each end of said journaled member, in which said journaled member rotates, said cylindrical housing being common to said bearings and extending substantially across both bearings and the intervening space therebetween, said bearings having thrust bearing surfaces only at their ends which face each other, and means on said journaled member for providing cooperating surfaces abutting said thrust bearing surfaces.

2. In an electric drive for railway traction, an axle, a wheel on each end of said axle adapted to run on rails, a rotatable horizontal quill about said axle, quill drive means for transmitting power from the quill to the axle, a bearing at each end of said quill, means for lubricating said bearings with lubricating oil, a quill cap supporting said bearings and encompassing said quill, said quill and bearings being formed with cooperative abutting thrust surfaces at the inner ends of said bearings only, oil from said bearings lubricating said thrust surfaces.

3. In an electric drive for railway traction, an axle, a wheel on each end of said axle adapted to run on rails, a rotatable horizontal quill about said axle, quill drive means for transmitting power from said quill to said axle, a bearing at each end of said quill, an oil feeding chamber below each bearing, a common oil reservoir for supplying oil to said chambers, said quill and bearings being formed with cooperative abutting thrust surfaces at the inner ends of said bearings only, oil from said bearings lubricating said thrust surfaces, and means including an auxiliary chamber about said quill for collecting oil escaping from said thrust surfaces.

4. In an electric drive for railway traction, an axle, a wheel on each end of said axle adapted to run on rails, a rotatable horizontal quill about said axle, quill drive means for transmitting power from the quill to the axle, a bearing at each end of said quill, a quill cap supporting said bearings and encompassing said quill, said quill and bearings being formed with cooperative abutting thrust surfaces at the inner ends of said bearings only, lubricant from said bearings lubricating said thrust surfaces, and means to lubricate said bearings and thrust surfaces with recirculating lubricant.

5. In an electric drive for railway traction, an axle, a wheel on each end of said axle adapted to run on rails, a rotatable horizontal quill about said axle, quill drive means for transmitting power from said quill to said axle, a bearing at each end of said quill, an oil feeding chamber below each bearing, a common oil reservoir for supplying oil to said chambers, said quill and bearings being formed with cooperative thrust surfaces at the inner ends of said bearings, oil from said bearings lubricating said thrust surfaces, and an auxiliary chamber about said quill for collecting oil escaping from said thrust surfaces, the outer ends of said bearings having circumferential oil-collecting grooves with drain holes to said feeding chambers.

6. An electric drive for railway traction, comprising the combination with an axle having wheels at the ends thereof adapted to run on rails, a rotatable quill, a quill cap for said quill, and quill drive means for transmitting power from said quill to said wheels; of bearing means for said quill, said bearing means including all the thrust bearings for said quill, said thrust bearings and quill being constructed and arranged so that all of said thrust bearings resist only thrust forces outwardly directed toward the ends of said quill with respect to the center of said quill.

7. In an electric drive for railway traction, the combination with an axle having wheels at the ends thereof, a rotatable horizontal quill about said axle, and means for transmitting power through said quill to said axle, of a quill cap about said quill, and bearing means at each end of said quill in which said quill rotates, said bearing means comprising bearing portions within said quill cap, said quill cap having grooves at the inward ends of said bearing portions with respect to said wheels, said bearing portions and quill including protuberances protruding into said grooves and providing thrust bearing surfaces for said quill for axially-directed forces.

ERICH O. MUELLER.